(12) United States Patent
Anderson et al.

(10) Patent No.: US 6,195,487 B1
(45) Date of Patent: Feb. 27, 2001

(54) COMPOSITE CABLE FOR ACCESS NETWORKS

(75) Inventors: Aaron Anderson, Batesburg; Grant Davidson; John Sach, both of Columbia, all of SC (US)

(73) Assignee: Pirelli Cable Corporation, Lexington, SC (US)

( * ) Notice: Subject to any disclaimer, the term of this patent is extended or adjusted under 35 U.S.C. 154(b) by 0 days.

(21) Appl. No.: 09/108,248

(22) Filed: Jun. 30, 1998

(51) Int. Cl.[7] .................................................. G02B 6/44
(52) U.S. Cl. ............................ 385/101; 385/100; 385/101; 385/103; 385/113; 174/23 R; 174/70 R
(58) Field of Search ........................... 385/100, 101, 385/103, 113; 174/70 R, 23 R; 57/212

(56) References Cited

U.S. PATENT DOCUMENTS

| | | | |
|---|---|---|---|
| 4,216,645 | * 8/1980 | Andersen | 57/212 |
| 4,278,835 | * 7/1981 | Jackson | 174/70 |
| 4,365,865 | 12/1982 | Stiles | 350/96.23 |
| 4,552,432 | 11/1985 | Anderson et al. | 350/96.23 |
| 4,695,127 | 9/1987 | Ohlhaber et al. | 350/96.23 |
| 4,895,426 | 1/1990 | Pinson | 350/96.23 |
| 4,907,855 | 3/1990 | Oestreich | 350/96.23 |
| 4,952,012 | 8/1990 | Stamnitz | 350/96.23 |
| 5,042,903 | 8/1991 | Jakubowski | 385/101 |
| 5,125,061 | * 6/1992 | Marlier et al. | 385/101 |
| 5,125,062 | 6/1992 | Marlier et al. | 385/101 |
| 5,146,046 | * 9/1992 | Arroyo et al. | 174/23 R |
| 5,202,944 | 4/1993 | Riordan | 385/101 |
| 5,268,971 | 12/1993 | Nilsson et al. | 385/101 |
| 5,275,038 | 1/1994 | Sizer et al. | 73/151 |
| 5,418,878 | 5/1995 | Sass et al. | 385/101 |
| 5,448,669 | 9/1995 | Dunn et al. | 385/101 |
| 5,463,711 | 10/1995 | Chu | 385/101 |
| 5,468,913 | 11/1995 | Seaman et al. | 174/102 R |
| 5,469,523 | 11/1995 | Blew et al. | 385/101 |
| 5,621,841 | * 4/1997 | Field | 385/113 |
| 5,651,081 | 7/1997 | Blew et al. | 385/101 |
| 5,677,974 | 10/1997 | Elms et al. | 385/101 |
| 5,745,627 | 4/1998 | Arroyo et al. | 385/101 |
| 5,913,003 | 6/1999 | Arroyo et al. . | |
| 5,917,977 | 6/1999 | Barrett . | |

FOREIGN PATENT DOCUMENTS

| | | | |
|---|---|---|---|
| 0361863 | 4/1990 | (EP) | H01B/7/28 |
| 0471600 | 2/1992 | (EP) | H01B/7/22 |
| 0533771 | 3/1996 | (EP) . | |
| 0709860 | 5/1996 | (EP) . | |
| 0782025 | 7/1997 | (EP) . | |
| 0853249 | 7/1998 | (EP) | G02B/6/44 |
| 2262359 | 6/1993 | (GB) | H01B/11/22 |

\* cited by examiner

*Primary Examiner*—Thong Nguyen
*Assistant Examiner*—Craig Curtis
(74) *Attorney, Agent, or Firm*—Norris, Mc Laughlin & Marcus; L. P. Brooks (57) ABSTRACT

A composite cable for distributing electrical power to components in an optical fiber network and for transmitting optical signals between optical fiber network components includes at least one layer of insulated electrical conductors arranged in side-by-side relation to provide a layer of conductors of a thickness substantially equal to the thickness of the conductors. The conductors of the at least one layer of conductors are S-Z stranded and surround the optical fibers which are loosely contained in at least one plastic buffer tube to provide desirable structural and operational features to the cable and to an optical fiber network in which the cable can be included.

19 Claims, 5 Drawing Sheets

COMPOSITE CABLE FOR ACCESS NETWORKS

FIELD OF THE INVENTION

The present invention relates to a composite cable for conveying electrical and optical energy, and more particularly, a composite cable for an optical fiber network containing electrically conductive elements for supplying electrical power and optical fibers for distributing optical signals.

BACKGROUND OF THE INVENTION

Optical fiber is now used in a variety of telecommunication applications because of its small physical size and high bandwidth capacity.

An optical fiber access network provides for the distribution of telecommunications data among various locations, such as between a central office (CO) and a location remote from the CO, often called an optical network unit (ONU), over optical fibers.

In many current optical access networks, the active components in the CO, which include optical and electrical devices, are powered by the power that a power utility supplies directly to the building or facility housing the CO. The ONU likewise requires electrical power for converting optical signals to electrical signals for further processing and distribution and for converting electrical signals to optical signals for transmission back through the fiber network to the CO. This power can originate from the same source in the CO, or more often, originate from a power source located remotely from the CO. This remote power source (RPS) typically converts AC power supplied by the power utility to a lower voltage DC power suitable for handling by communications craftspersons.

The most common method of carrying the power from the CO or RPS to the ONU is via a standard copper twisted-pair telephone cable or a standard coaxial cable, neither of which contains optical fiber. In addition, it has been proposed to carry the power by using a composite cable including groups of twisted-pair telephone wires bundled together in some fashion with a plastic tube or tubes containing optical fibers. See U.S. Pat. No. 5,268,971, incorporated by reference herein.

These composite cables, however, are unsatisfactory in terms of their size, scalability, maneuverability and taut-sheath accessibility. Conventional composite cables which contain electrical conductors arranged as twisted pairs or bundles have a large diameter and are heavy in weight. These conventional cables are of such size and weight because two wires which are twisted as opposed to untwisted or wires which are grouped as opposed to layered require excess space. The space requirement of the electrical conductor portion of these composite cables typically constitutes the greatest proportion of the composite cable. The contribution of the electrical conductors to the size of the composite cable limits the scalability of the cable design in terms of the number of optical fibers and electrical conductors which can be included during cable manufacture, because the size of the cables utilized in optical fiber networks must satisfy preset standards as to duct sizes, splice enclosures entrance ports, installation equipment and termination hardware. Also, a composite cable which is heavy and has a large diameter is extremely bulky and, thus, hard to maneuver in storage and installation. In addition, conventional composite cables are not constructed to allow for ease of mid-span or taut-sheath access to the optical fibers without damage to the electrical conductors when the electrical conductors surround the optical fibers in the composite cable.

Furthermore, the need for twisting the telephone wires when they are used for power distribution is disappearing in modern fiber access networks because of an increased confidence in the reliability of the fiber network as the only communications medium and a decreased interest in having communication-grade twisted-pairs available for future use.

Therefore, there exists a need for a composite cable which is compact, has a small diameter, is lightweight, mechanically protects the optical fibers from damage, is scalable in terms of optical fiber and electrical conductor capacity, is easy to install and terminate, allows for ease of mid-span or taut-sheath fiber access without harm to either the fibers or the conductors and is compatible with modern optical access network limitations and standards.

SUMMARY OF THE INVENTION

In accordance with the present invention, a composite cable for conveying optical signals and electrical power includes at least one plastic buffer tube which loosely contains at least one optical fiber, a water swellable tape or yarn disposed around and extending longitudinally along the length of the at least one buffer tube and at least one layer of electrical conductors disposed around the water swellable tape or yarn. Each of the conductors includes a plastic insulation outer covering and is arranged in the layer of conductors to provide that the layer of conductors is compact and has a thickness which does not exceed the thickness of a single insulated conductor. In addition, the conductors are S-Z stranded longitudinally along the length of the cable to provide flexibility and ease of mid-span and taut-sheath access to optical fibers or other conductors in the composite cable surrounded by the layer of conductors. An outer plastic jacket surrounds the layer of conductors.

In a preferred embodiment, the composite cable includes a central plastic buffer tube which loosely contains at least one optical fiber and includes a flowable water blocking material, such as a thixotropic gel, which fills any empty spaces in the buffer tube and does not restrict movement of the optical fibers in the buffer rube. A first water swellable tape or yarn is disposed around and extends longitudinally along the length of the buffer tube. A layer of insulated conductors, each having substantially the same diameter, is disposed around the water swellable tape. The conductors are in side-by-side relation and are S-Z stranded longitudinally along the length of the central buffer tube. Thus, the layer of conductors has a radial thickness substantially equal to the diameters of the insulated conductors. A second water swellable tape or yarn is disposed around and extends longitudinally along the length of the layer of conductors. A layer of strength members is disposed around the second water swellable tape or yarn and extends longitudinally along the length of the cable. An inner plastic jacket surrounds the layer of strength members and a conductive armor is disposed around the inner jacket and extends longitudinally along the length of the cable. An outer plastic jacket surrounds the conductive armor.

In alternative embodiments, the central loose tube composite cable includes a plurality of radially separated layers of insulated conductors where the conductors in a layer have substantially the same diameter and are in side-by-side relation. Therefore, each layer of conductors is not thicker than the thickness of a single conductor in the layer. The conductors in at least one of the layers of conductors are S-Z stranded longitudinally along the length of the cable. A water swellable tape or yarn extending longitudinally along the length of the cable is disposed between adjacent layers of conductors and between the outermost layer of conductors and the layer of strength members.

In another preferred embodiment, the composite cable includes a central strength member surrounded by plastic insulation and a plurality of S-Z stranded plastic buffer tubes surrounding and extending longitudinally along the length of the central strength member. Each of the tubes loosely contains at least one optical fiber. A water swellable tape or yarn is disposed around the S-Z stranded buffer tubes and extends longitudinally along the length of the cable. A first inner plastic jacket surrounds the water swellable tape or yarn. At least one layer of insulated conductors having a thickness that does not exceed the diameter of the insulated conductors is disposed around the first inner jacket. The conductors in the layer of conductors are S-Z stranded longitudinally along the length of the cable. A second inner plastic jacket surrounds the layer of conductors and a conductive armor is disposed around the second inner jacket and extends longitudinally along the length of the cable. An outer plastic jacket surrounds the conductive armor. Flooding material fills any empty spaces between the first inner jacket and the outer jacket.

In one aspect of the present invention, the composite cables of the present invention are included in an optical fiber network as interconnections between network devices to provide for transfer of optical signals and electrical power between network devices.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

The invention is illustrated below in connection with composite cables which include optical fibers loosely held in at least one plastic buffer tube and at least one layer of S-Z stranded, side-by-side and insulated electrical conductors. The layer of conductors has a radial dimension substantially equal to the radial dimension of the individual conductors and surrounds the at least one plastic buffer tube.

Figure 1A:
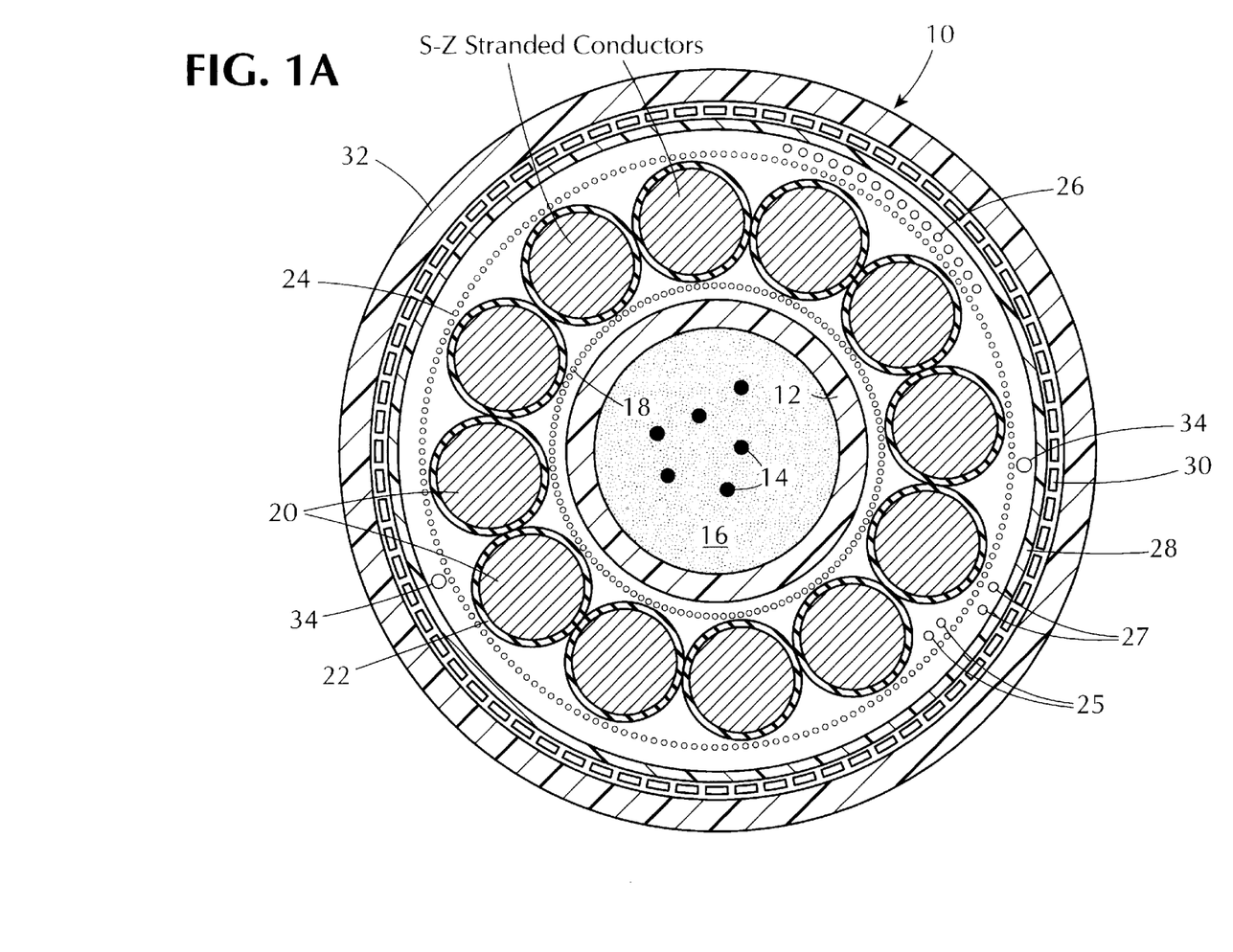
FIG. 1A is a cross-sectional view of an embodiment of a central loose tube composite cable in accordance with the present invention.

FIG. 1A illustrates a preferred embodiment of a composite optical communications and power cable 10 in accordance with the present invention. Referring to FIG. 1A, the cable 10 includes a central plastic buffer tube 12 of a polyolefin, such as PBT, polyethylene or polypropylene, loosely containing optical fibers 14. A known type of flowable filling material 16, such as a water blocking compound, buffer tube filling material, oil or gel, fills any or all of the empty spaces within the central tube 12 which are not occupied by the fibers 14, thereby permitting the fibers 14 to move freely within the central tube 12. The lengths of the fibers 14 preferably exceed the length of the central tube 12 by no more than fifteen hundredths of a percent, or EFL (Excess Fiber Length) is <0.15%. An exemplary single loose buffer tube core which can be used as the central buffer tube 12 in the cable 10 is currently manufactured and marketed as a Central Loose Tube or CLT™ cable by the assignee of the present application.

To assist in moisture protection, the central tube 12 is surrounded by a longitudinally applied, solid water blocking material, such as a water swellable element or layer which can, for example, be a known type of tape or a plurality of yarns both of which absorb moisture and swell.

Electrical conductors 20 in side-by-side relation are disposed around and along the longitudinal length of the buffer tube 12, and each of the conductors 20 is surrounded by insulation 22, such as high density polyethylene (HDPE). The conductors 20 preferably are individual, solid, copper conductors of substantially the same diameter and provide a conductor layer of a radial thickness substantially equal to the diameter of the conductors 20.

Although the insulated conductors 20 can be helically wound around or disposed longitudinal to the solid, water swellable layer 18, such helical winding or longitudinal disposition of the conductors 20 makes it difficult to obtain access to the optical fibers 14 within the buffer tube 12, for example, for the purposes of making branch connections to the fibers 14. Thus, the helically wound or longitudinally disposed conductors 20 form, in effect, a substantially continuous metal layer around the layer 18 and the buffer tube 12, and there is no slack in the conductors 20 permitting them to be separated for the purpose of gaining access to the optical fibers 14. Accordingly, to obtain access to the fibers 14, it is necessary to cut a plurality of the conductors 20 at the area where access to the fibers 14 is desired. Consequently, after the desired connections to the fibers 14 have been made, the conductors 20 which have been cut must be reconnected electrically which involves time and labor and usually splices with added conductor lengths.

Figure 1B:
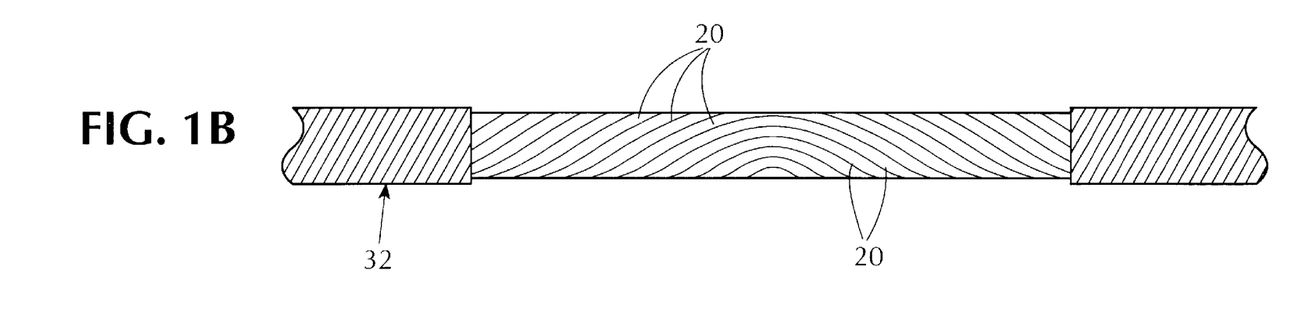
FIGS. 1B and 1C longitudinal cutaway views of the cable of FIG. 1A showing the layer of S-Z stranded conductors and the conductors pulled away from the central loose tube, respectively.
Figure 1C:
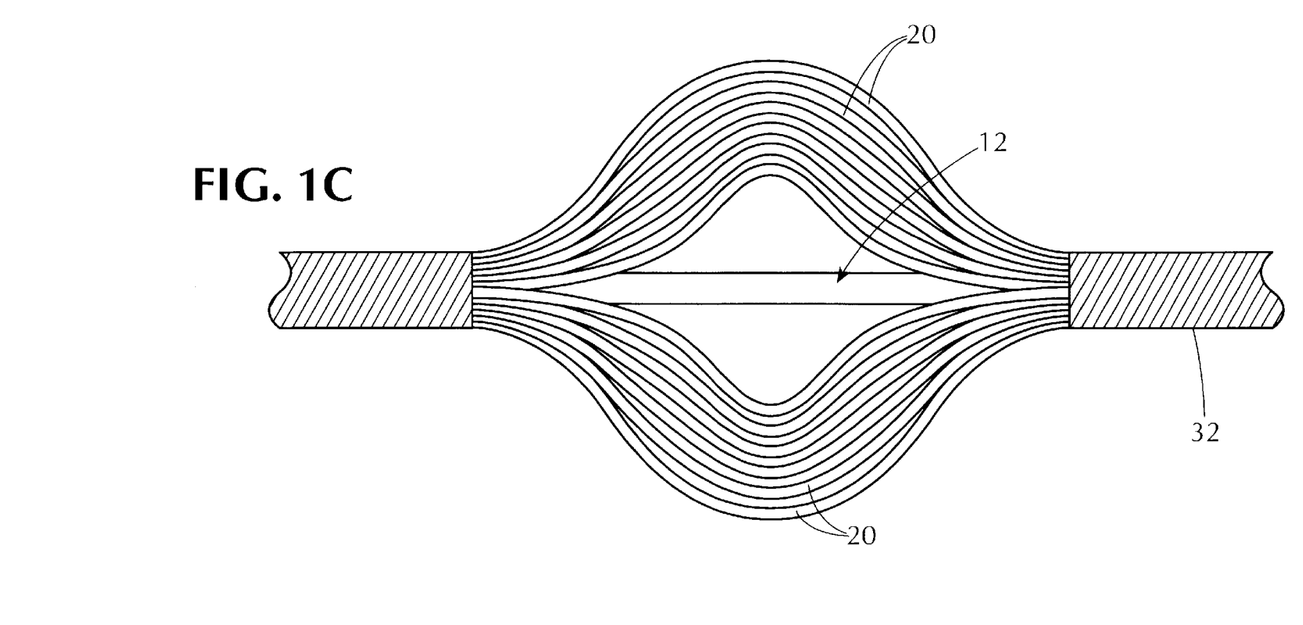

Therefore, preferably, the conductors 20 are wound around the layer 18 in S-Z fashion, or reverse oscillating lay, which, as is known in the art, provides conductor slack at the portions where the direction of winding of the conductors 20 reverses. FIG. 1B shows a longitudinal view of the arrangement of the S-Z wound conductors 20 at a longitudinal portion of the cable 10 where cable components which can be disposed between the layer of conductors 20 and an outer sheath or plastic jacket 32 of the cable 10, hereinafter described, are not shown and a corresponding longitudinal portion of the jacket 32 is removed. With such S-Z winding of the conductors 20, the conductors 20 can be pulled away from the layer 18, and hence, the buffer tube 12, where the conductors 20 reverse winding direction without cutting the conductors 20. When the conductors 20 are so pulled or ballooned away, the layer 18 and the buffer tube 12 are exposed permitting access to the fibers 14 by cutting of the layer 18 and the tube 12. FIG. 1C shows the cable 10 of FIG. 1B with the conductors 20 pulled away from the buffer tube 12. After connections to the fibers 14 are made, the conductors 20 can be merely repositioned without requiring that they be electrically reconnected.

Preferably, the S-Z winding of the conductors 20 is such that the reversal points are relatively close together, e.g., not more than 16 inches apart and preferably not more than 8 inches apart, so that at whatever point the cable outer jacket 32 is opened, a reversal point will be not more than about 8 inches from the sheath opening. However, if desired, the outer jacket 32 may bear markings on its outer surface which correspond to the reversal points of the conductors 20.

The insulated conductors 20 in the conductor layer are color-coded in pairs by extruding a colored insulation stripe on one conductor of the pair, where the color of the stripe on the one conductor corresponds to the primary color of the insulation of the other, or mate, conductor of the pair and where the other conductor includes an extruded colored insulation stripe which is the same color as the primary color of the insulation of the one conductor. For example, the layer of conductors may have a conductor whose insulation is colored blue with a white stripe and which is paired with a conductor whose insulation is colored white with a blue stripe. In a pair of conductors, one conductor of the pair is a conductor at ground potential and the other conductor of the pair is at a potential above ground potential. The dual color coding permits a field technician, through positive identification, ease in installation of the correct pairs of conductors at the end of the composite cable 10 to connectors of an electrical fixture in a device to which the composite cable 10 is connected. The connectors can be a part of or coupled to a device contained in an intermediate terminal or an optical network unit (ONU) of an optical fiber network.

The ratio of the number of the conductors 20 in a composite cable to the number of optical fibers 14 preferably is 4 to 1, but the ratio can be different as shown in the illustrated cable 10 which includes twelve conductors 20 and six fibers 14.

Referring again to FIG. 1A, a water blocking layer 24 of solid water swellable material similar in construction to the layer 18 surrounds the layer of conductors 20. When the conductors 20 are wound in S-Z fashion, the conductors 20 can move away from the layer 18 unless restrained. Preferably, binding tapes or yarns 25 and 27 are helically wound around the conductors 20 and the layer 24, respectively, to hold them in place.

When the conductors 20 are wound in S-Z fashion, the conductors 20 provide little, if any resistance to pulling forces on the cable 10. Therefore, to provide resistance to pulling forces, the layer 24 has a plurality of longitudinally extending strength members 26 applied thereto. Such strength members 26 can, for example, be flexible polymeric, non-polymeric or glass rods or glass, glass yarns or aramid fibers embedded in a resin, such as an epoxy resin or E glass.

An inner plastic jacket 28, preferably made from medium density polyethylene (MDPE) and extruded, surrounds the layer of strength members 26. A conductive armor 30, preferably made from a metal such as steel, encircles the jacket 28. The inner jacket 28 further separates the insulated conductors 20 from the conductive armor 30.

The outer plastic jacket 32, preferably made from MDPE and extruded, surrounds the armor 30.

If desired, longitudinal ripcords 34, preferably colored for ease of identification, are provided under the inner jacket 28 to facilitate opening of the inner jacket 28 after overlying portions of the jacket 32 and the armor 30 have been removed.

Preferably, the outside diameter of the cable 10 is about 0.5 to about 0.7 inches.

In an alternative embodiment, water blocking filling compound or additive or water swellable tape fills any or all of the empty spaces between the armor 30 and the inner jacket 28 and/or between the inner jacket 28 and the core tube 12. In a further alternative embodiment, water blocking filling compound or additive is also included in any or all empty spaces between the inner jacket 28 and the outer jacket 32.

In accordance with the present invention, the armor 30, preferably, is a so-called controlled bond armor of a known type and is essentially a three layer Zetabond armor from Dow Chemical. Such controlled bond armor comprises a thin steel sheet coated on the side facing the outer jacket 32 with two bonded layers of polymer, an inner layer engaging the steel sheet and an outer layer which bonds securely with the outer jacket 32. The bond between the outer layer of polymer and the inner layer of polymer is weaker than the bond between the inner layer of polymer and the steel sheet and the bond between the outer layer of polymer and the jacket 32 so that, when the outer jacket 32 is cut and pulled away from the steel sheet, the inner polymer layer remains on the steel while the outer polymer layer is removed with the outer jacket 32.

Figure 2:
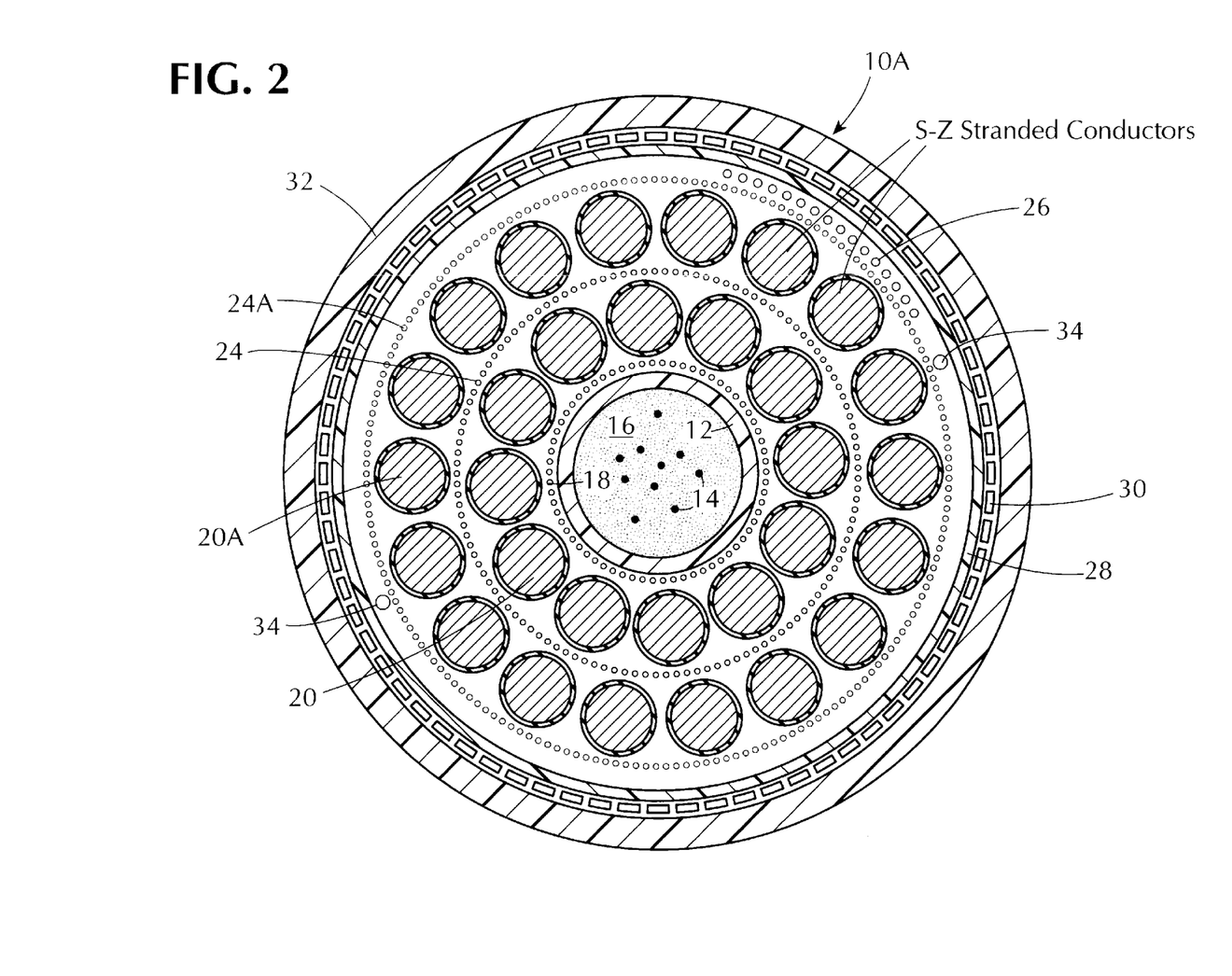
FIG. 2 is a cross-sectional view of an alternative embodiment of a central loose tube composite cab in accordance with the present invention.
Figure 3:
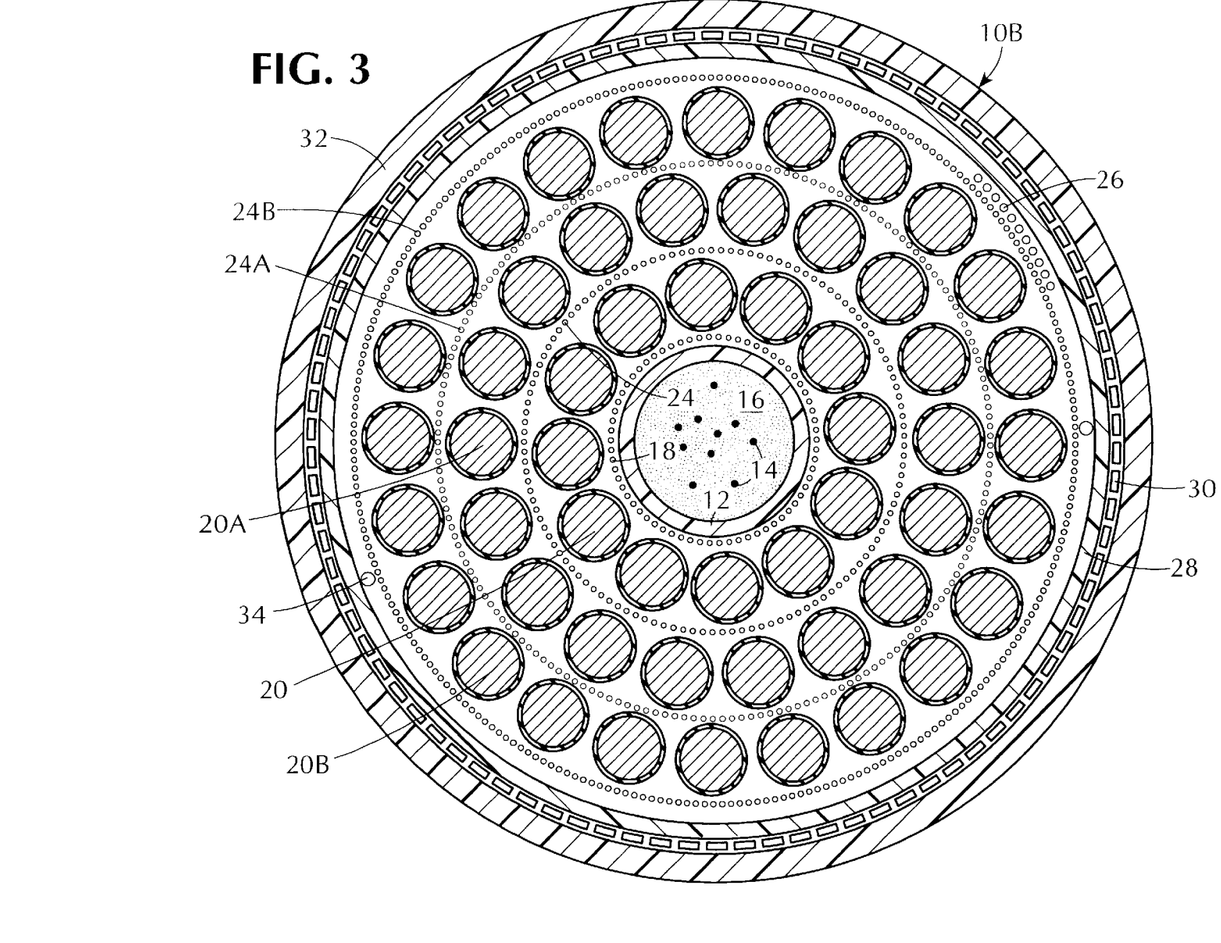
FIG. 3 is cross-sectional view of another alternative embodiment of a central loose tube co cable in accordance with the present invention.

FIGS. 2 and 3 illustrate alternative preferred embodiments of central loose tube composite cables 10A and 10B, respectively, which are identical in structure to the cable 10 except for the addition of further layers of conductors and water swellable tapes, as described below. Like reference numerals are used to refer to elements having similar, and preferably identical, structural and functional characteristics as those described above in connection with the cable 10.

Referring to FIG. 2, the composite cable 10A includes a second layer of electrical conductors 20A disposed around the layer 24 of solid water swellable material and a layer 24A of solid water swellable material encircles the layer of conductors 20A. Similarly, referring to FIG. 3, the composite cable 10B includes a second layer of conductors 20A, a water swellable layer 24A and also a third layer of electrical conductors 20B disposed around the water swellable layer 24A and a water swellable layer 24B which surrounds the layer of conductors 20B. The water swellable tapes 24 and 24A separate the layers of conductors 20 and 20A and the layer of conductors 20A and 20B from each other, respectively. In the cables 10A and 10B, the layer of aramid strength member yarns 26 is disposed surrounding the outermost water swellable layers 24A and 24B, respectively.

The cable 10A preferably includes ten conductors 20, sixteen conductors 20A and two to twelve optical fibers 14 in the tube 12 and is about 0.6 to 0.8 inches in diameter. The cable 1OB preferably includes ten conductors 20, sixteen conductors 20A, twenty-four conductors 20B and two to twelve optical fibers 14 in the tube 12 and is about 0.7 to 0.9 inches in diameter.

In alternative embodiments of FIGS. 2 and 3, any or all empty spaces in the region of the composite cable where the layer of conductors is disposed are filled with a water blocking filling compound or additive and such compound or additive can be used in place of the layers of solid water swellable material.

Figure 4:
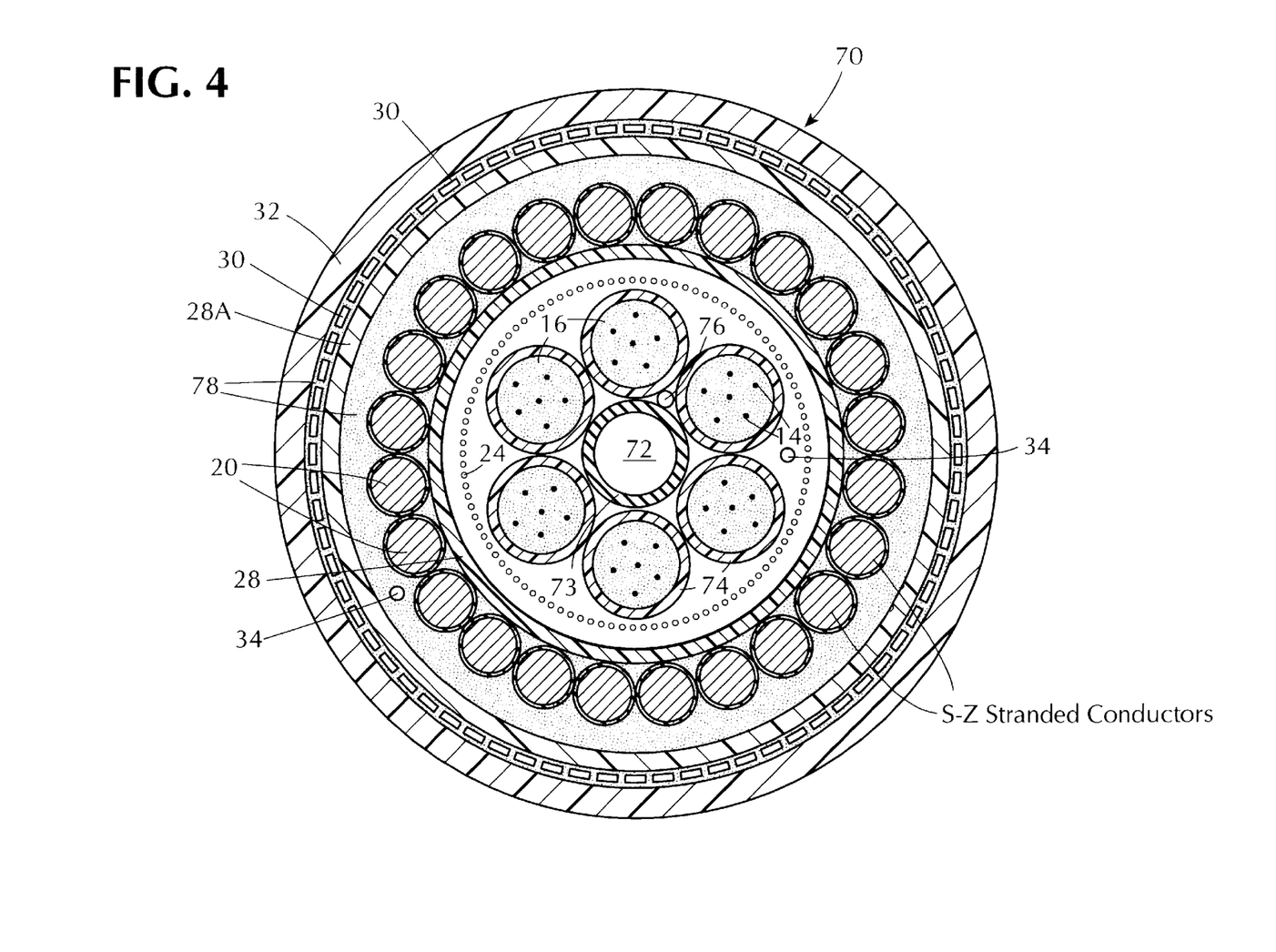
FIG. 4 is cross-sectional view of another embodiment of a loose tube composite cable in accordance with the present invention.

FIG. 4 shows a cross-section of a composite cable 70 in accordance with another embodiment of the invention. Like reference numerals are used to refer to elements having similar, and preferably identical, structural and functional characteristics as those described above in connection with the cables 10, 10A and 10B. Referring to FIG. 4, the cable 70 includes a conductive central strength or E glass member 72 surrounded by an insulation 73, such as HDPE. Six plastic buffer tubes 74, each of which loosely contains optical fibers 14 and includes filling material 16 in any or all of the empty spaces of the tubes, are S-Z stranded longitudinally along the length of the strength member 72. One or more water swellable yarns 76 are disposed in the interstices between the tubes 74 and the strength member 72 and extend longitudinally along the length of the cable 70.

A layer 24 of longitudinally applied, solid water swellable material, e.g., a water swellable tape or yarn, surrounds the S-Z stranded buffer tubes 74. A first inner plastic jacket 28, preferably made from MDPE, surrounds the water swellable tape 24.

A layer of insulated electrical conductors 20, preferably stranded in S-Z fashion, is disposed along the longitudinal length of the inner jacket 28. A second inner plastic jacket 28A surrounds the layer of S-Z stranded conductors 20. A conductive armor 30 encircles the jacket 28A and an outer plastic jacket 32 surrounds the armor 30. Water blocking filling compound or additive 78 fills any or all of the empty spaces between the inner jackets 28 and 28A and/or between the outer jacket 32 and the jacket 28A. In one alternative embodiment, the filling compound 78 between the jackets 28 and 28A can, for example, be entirely or partly replaced by water swellable barrier tapes which surround the layer of conductors 20 and form a layer of water swellable material which separates the jacket 28A from the conductors 20 to prevent bonding of the former to the latter.

Longitudinal ripcords 34, preferably colored for ease of identification, can be provided under the jacket 28.

The central strength member 72 of the composite cable, as shown in FIG. 4, acts as a tensile member for the entire composite cable assembly, including the buffer tubes 74, and although the strength member yarns 26 can be included as in the embodiments of FIGS. 1–3, the member 72 can provide sufficient resistance of the cable to pulling forces. If the strength member 72 is electrically conductive, it can be used as an electrical neutral or ground bus.

The S-Z stranding of the conductors arranged in a layer of conductors in the inventive composite cable provides flexibility to the conductors. Also, S-Z stranding of the conductors permits ease of mid-span and taut-sheath access to the optical fibers surrounded by the conductors and avoids the need to sever the conductors in the layer(s) of conductors surrounding a buffer tube containing the optical fibers when mid-span or taut-sheath access to optical fibers is desired. For example, if an optical fiber in a buffer tube needs to be accessed in mid-span of the composite cable, the S-Z stranded conductors can be easily separated because S-Z stranding provides excess length or slack, as shown in FIG. 1C. In addition, in the cables 10A and 10B with multiple layers of conductors, if a conductor of an inner layer needs to be branched, the conductors in a layer of conductors which surrounds another, inner layer of conductors can be easily separated to allow for access to the conductors of the inner layer and, thus, provide ease of access to the conductors in the inner layer without requiring that any of the conductors in the one or more outer conductor layers is severed.

The conductors 20 in the composite cable of the present invention are intentionally arranged in side-by-side relation so that the radial thickness of the conductor layer is kept to a minimum, i.e., is substantially equal to the thickness of the conductors. The conductors are not bundled or grouped together, are not in coaxial form or bundled or stranded with the fiber tubes in the same layer of the composite cable and are not twisted pairs. The conductors are arranged in the inventive composite cable as a distinct and continuous layer or layers around the central buffer tube or a layer of S-Z stranded buffer tubes in the composite cable to maintain the thickness of a layer of conductors at a minimum. This conductor configuration permits a high packing density of conductors in a conductor layer without increasing the cable diameter. Consequently, the contribution of the conductors and other materials dependent on the diameter of the cable, e.g., the jacket material and armor, to the cable diameter and weight is reduced.

A composite cable having a smaller diameter and reduced weight improves ease of handling and installation of the cable. Also, there is a reduction in cable material and processing costs and the messengers, guys and anchors can be smaller. Further, a smaller diameter cable permits that longer lengths of composite cables can be stored on standard cable reels. As the space in the composite cable that the conductors occupy is reduced, the capacity of the composite cable is increased in terms of the number of optical fibers and electrical conductors that a composite cable can contain without exceeding the cable size limitations imposed by optical fiber network standards concerning duct size, closures and standard cable hardware. The reduction in cable weight also eases pulling of the cable by hand over longer distances and provides for reduced shipping costs.

The layer of conductors further operates as a shield that protects the optical fibers contained in the tube(s) of the composite cable from damage from external forces on the cable.

The conductors in a conductor layer of the composite cable are intended primarily for electrical power distribution. However, one or more conductors of a layer of conductors can be used for transmission of electrical analog or digital signals where the signal path extending between the source and destination of a signal transmission is relatively short. This most often occurs when maintenance personnel desire an electrical communications path between nodes. Although it is known that twisting of electrical wires avoids cross talk and interference when electrical signals are transmitted over electrical conductors, the degradation of the electrical signal that can result for transmission of an electrical signal over a short distance because the conductors are not twisted in the composite cables of the present invention would not be severe enough to affect signal quality.

The cables 10, 10A, 10B and 70 can be operated in a manner that is compatible with the operation of an existing optical fiber network. For example, the metallic conductive armor 30 of the cables 10, 10A and 10B, or, if used, the metallic central strength member 72 of the cable 70, can be utilized as an electrical conductor which is common to all circuits to which the conductors 20 of the cables supply power. As a result, each active device in an optical fiber network can be provided power by the conductors of the composite cable, which link the devices and share the same ground. The armor of the composite cable, for example, can constitute the common electrical ground for the circuits to which the conductors of the composite cable distribute power.

In another alternative, the central strength member 72 of the cable 70 can be a part of an electrical ground bus in an optical fiber network.

The structure of the composite cables 10, 10A, 10B and 70 reduces the possible disruption of optical signal transmission by damage to the optical fibers because the outer armor and the intervening layer of conductors protect the fragile optical fibers from damage.

Also, the conductors in the composite cable can provide a mechanical fault warning in an optical fiber network in advance of an impending fault in optical fiber communications in the network. For example, the conductors in the composite cable can provide a warning to the central office that there is a fault in the power supply, such as in a connecting composite cable or an intermediate terminal which provides for the transfer of power from one composite cable to the next composite cable or ONU in the optical fiber path. For example, if a power fault is present, a power drop would occur in the electrical power path but optical signal transmission would continue. The battery backup of an ONU or an intermediate terminal, for example, would provide power to a device therein which requires nominal power to operate and can detect the fault by way of detecting a reduction in the level of the power received at the device from a composite cable. Thus, the conductor(s) in the composite cable would indicate a fault in the electrical power supply path and provide an advance warning that the optical fiber communication path between the central office and the ONU may develop a fault, leading to disruption of optical signal transmission, because amplification and regeneration of optical signals could no longer be performed in network units in the faulty electrical power supply path.

Although preferred embodiments of the present invention have been described and illustrated, it will be apparent to those skilled in the art that various modifications may be made without departing from the principles of the invention.

What is claimed is:

1. A composite cable for conveying both electrical and optical energy comprising:
    a longitudinally extending plastic buffer tube loosely containing at least one optical fiber;
    at least one longitudinally extending layer of individually insulated electrical conductors disposed in side-by-side relation around said buffer tube to provide a conductor layer having a thickness substantially equal to the thickness of the conductors and wherein the conductors are S-Z stranded;
    an outer plastic jacket surrounding said layer of conductors;
    a strength member extending longitudinally in said cable and disposed within said outer jacket; and
    water blocking material in at least some of the otherwise empty spaces within said outer jacket.

2. The cable of claim 1, wherein said water blocking material comprises a flowable material in at least some of the otherwise empty spaces in said buffer tube and a layer of solid water absorbing material intermediate said buffer tube and said layer of electrical conductors.

3. The cable of claim 2, wherein said strength member comprises a layer of yarns intermediate said layer of electrical conductors and said outer jacket.

4. The cable of claim 1, wherein the layer of conductors includes at least one pair of color-coded insulated electrical conductors.

5. The cable of claim 4, wherein one of the conductors of the pair includes a colored stripe on its insulation, wherein the color of the colored stripe corresponds to a primary color of the insulation of the other conductor of the pair and wherein the other conductor of the pair has an insulation stripe having a color which is the same as a primary color of the insulation of the one conductor.

6. The cable of claim 1, wherein the ratio of the number of electrical conductors to the number of optical fibers in said buffer tube is in the range from about two-to-one to about six-to-one.

7. The cable of claim 1, wherein the electrical conductors are solid copper wires.

8. The cable of claim 1 further comprising:
    an inner plastic jacket surrounding the buffer tube, wherein said outer plastic jacket surrounds the inner plastic jacket; and
    a layer of longitudinally extending armor intermediate said inner jacket and said outer jacket.

9. The cable of claim 2 further comprising at least one binding tape or yarn helically wound around said layer of conductors for securing the layer of conductors in place, wherein the binding tape or yarn is intermediate the conductors and the outer jacket.

10. The cable of claim 2 further comprising at least one binding tape or yarn around said solid water absorbing material for securing the solid water absorbing material in place, wherein the binding tape or yarn is intermediate the solid water blocking material and the outer jacket.

11. A composite cable for conveying both electrical and optical energy comprising:
    a longitudinally extending plastic buffer tube loosely containing at least one optical fiber;
    a water blocking material filling at least some of the otherwise empty spaces in the buffer tube;
    a longitudinally extending layer of solid water swellable material disposed around said buffer tube;
    at least one longitudinally extending layer of individually insulated electrical conductors disposed in side-by-side relation around the layer of solid water swellable material to provide a conductor layer having a thickness substantially equal to the thickness of the conductors and wherein the conductors are S-Z stranded;
    an outer plastic jacket surrounding said layer of conductors; and
    at least one strength member extending longitudinally in said cable and disposed within said outer jacket.

12. The cable of claim 11, further comprising:
    an inner plastic jacket surrounding said layer of solid water swellable material, wherein said outer plastic jacket surrounds said inner plastic jacket and wherein said strength member comprises a plurality of longitudinally extending yarns around said layer of conductors and intermediate said layer of conductors and said inner plastic jacket; and
    a layer of longitudinally extending armor intermediate said inner jacket and said outer jacket.

13. The cable of claim 11, wherein said water blocking material is a first layer of solid water blocking material intermediate said buffer tube and said layer of electrical conductors and further comprising a second layer of solid water blocking material around said layer of electrical conductors and a further layer of individually insulated electrical conductors disposed in side-by-side relation around said second layer of solid water blocking material and intermediate said second layer of water blocking material and said outer jacket, said further layer of the electrical conductors having a thickness substantially equal to the thickness of the conductors in said further layer and the conductors of said further layer being S-Z stranded.

14. A composite cable for conveying electrical and optical energy comprising:
    a longitudinally extending central plastic buffer tube loosely containing at least one optical fiber;

a water blocking material filling at least some of any otherwise empty paces in the buffer tube;

a first longitudinally extending layer of a solid water swellable material disposed around said buffer tube;

at least one longitudinally extending layer of individually insulated electrical conductors disposed in side-by-side relation around said first water swellable material to provide a conductor layer having a thickness substantially equal to the thickness of the conductors and wherein the conductors are S-Z stranded;

a second longitudinally extending layer of a water swellable material disposed around said layer of conductors;

a layer of longitudinally extending strength members disposed around the second layer of water swellable material and extending longitudinally along the length of the cable;

an inner plastic jacket surrounding the layer of strength members;

a longitudinally extending conductive armor disposed around the inner jacket; and an outer plastic jacket surrounding the conductive armor.

15. The cable of claim 16 further comprising at least one further longitudinally extending layer of individually insulated conductors in side-by-side relation disposed between the inner jacket and said second layer of water swellable material, wherein the conductors of said further layer of conductors are S-Z stranded.

16. The cable of claim 15 further comprising a third longitudinally extending layer of water swellable material disposed between the at least one further layer of conductors and said inner jacket.

17. A composite cable for conveying electrical energy and optical signals comprising:

a longitudinally extending central strength member;

a plurality of plastic buffer tubes, wherein each of the buffer tubes loosely contains at least one optical fiber and wherein the buffer tubes are disposed around the central strength member and are S-Z stranded;

a water blocking material filling at least some of any otherwise empty spaces in each of the buffer tubes;

a longitudinally extending layer of water swellable material disposed around the S-Z stranded buffer tubes;

a first inner plastic jacket surrounding the layer of water swellable material;

at least one longitudinally extending layer of insulated electrical conductors in side-by-side relation and disposed around the first inner jacket to provide a conductor layer having a thickness substantially equal to the thickness of the conductors and wherein the conductors are S-Z stranded;

an outer plastic jacket surrounding the layer of conductors; and a water blocking material in at least some of any otherwise empty spaces between the first inner jacket and the outer jacket.

18. The cable of claim 17 further comprising:

a second inner jacket surrounding the layer of conductors, wherein said outer plastic jacket surrounds the second inner jacket; and a layer of longitudinally extending armor intermediate said second inner jacket and said outer jacket.

19. A composite cable for conveying both electrical and optical energy comprising:

a longitudinally extending plastic buffer tube loosely containing at least one optical fiber;

a water blocking material filling at least some of the otherwise empty spaces in the buffer tube;

a longitudinally extending layer of solid water swellable material disposed around said buffer tube;

at least one longitudinally extending layer of individually insulated electrical conductors disposed in side-by-side relation around the layer of solid water swellable material to provide a conductor layer having a thickness substantially equal to the thickness of the conductors and wherein the conductors are S-Z stranded;

an outer plastic jacket surrounding said layer of conductors;

at least one strength member extending longitudinally in said cable and disposed within said outer jacket;

an inner plastic jacket surrounding said layer of solid water swellable material, wherein said outer plastic jacket surrounds said inner plastic jacket and wherein said strength member comprises a plurality of longitudinally extending yarns around said layer of conductors and intermediate said layer of conductors and said inner plastic jacket and a layer of longitudinally extending armor intermediate said inner jacket and said outer jacket, wherein said layer of armor comprises a metal sheet with two layers of polymer between said metal sheet and said outer jacket, one of said layers of polymer being bonded to said metal sheet and the other of said polymer layers being bonded to both said one polymer layer and said outer jacket, wherein the bond between the two polymer layers is weaker than the bond between said one polymer layer and said metal sheet and the bond between the other polymer layer and said outer jacket so that, upon removal of said outer jacket, said one polymer layer remains bonded to the metal sheet while the other polymer layer is removed with the outer jacket.

* * * * *

UNITED STATES PATENT AND TRADEMARK OFFICE
CERTIFICATE OF CORRECTION

PATENT NO. : 6,195,487 B1
DATED : February 27, 2001
INVENTOR(S) : Anderson et al.

It is certified that error appears in the above-identified patent and that said Letters Patent is hereby corrected as shown below:

Column 1,
Line 62, after "enclosures" insert a comma (,);

Column 2,
Line 43, change "rube" to -- tube --;

Column 3,
Line 47, change "cab" to -- cable --;
Line 51, change "co" to -- composite --;

Column 11,
Line 49, after "of" insert -- individually --.

Signed and Sealed this

Eighteenth Day of December, 2001

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,195,487 B1
DATED : February 27, 2001
INVENTOR(S) : Anderson et al.

It is certified that error appears in the above-identified patent and that said Letters Patent is hereby corrected as shown below:

<u>Column 11,</u>
Line 24, change "16" to -- 14 --.

Signed and Sealed this

Twelfth Day of October, 2004

JON W. DUDAS
*Director of the United States Patent and Trademark Office*